US011725906B2

(12) United States Patent
Garcia Ruiz et al.

(10) Patent No.: US 11,725,906 B2
(45) Date of Patent: Aug. 15, 2023

(54) HOLSTER SYSTEM, HOLDER, HOLSTER AND QUICK-RELEASE GUN ANCHOR SYSTEM

(71) Applicants: Jorge Garcia Ruiz, Cadiz (ES); Joaquin Lanchazo Mulero, Cadiz (ES)

(72) Inventors: Jorge Garcia Ruiz, Cadiz (ES); Joaquin Lanchazo Mulero, Cadiz (ES)

( * ) Notice: Subject to any disclaimer, the term of this patent is extended or adjusted under 35 U.S.C. 154(b) by 147 days.

(21) Appl. No.: 17/424,550

(22) PCT Filed: Nov. 6, 2019

(86) PCT No.: PCT/ES2019/070749
§ 371 (c)(1),
(2) Date: Jul. 21, 2021

(87) PCT Pub. No.: WO2020/104717
PCT Pub. Date: May 28, 2020

(65) Prior Publication Data
US 2022/0221247 A1    Jul. 14, 2022

(30) Foreign Application Priority Data
Nov. 21, 2018   (ES) .................. ES201831127

(51) Int. Cl.
*F41C 33/02*      (2006.01)
*B60R 7/14*       (2006.01)

(52) U.S. Cl.
CPC ........... *F41C 33/0272* (2013.01); *B60R 7/14* (2013.01); *F41C 33/0245* (2013.01); *F41C 33/0263* (2013.01); *F41C 33/0254* (2013.01)

(58) Field of Classification Search
CPC .. F41C 33/02; F41C 33/0236; F41C 33/0245; F41C 22/0263; F41C 33/041
See application file for complete search history.

(56) References Cited

U.S. PATENT DOCUMENTS 3,550,822 A  *  12/1970  Lloyd ................. F41C 33/0263
                                                           42/70.11
3,828,990 A  *   8/1974  Baldocchi ............ F41C 33/045
                                                           224/678
(Continued)

FOREIGN PATENT DOCUMENTS

EP        1479998 A2     11/2004
EP        2699868 B1      6/2015
(Continued)

*Primary Examiner* — Derrick R Morgan
(74) *Attorney, Agent, or Firm* — Eugenio J. Torres-Oyola; Victor M. Rodriguez-Reyes; Rafael Rodriguez-Muriel

(57) ABSTRACT

Holster, support and anchorage quick release system for guns that comprises left and right assembly parts configured to guide the gun when holstered, a trigger guard ratchet, a release button and a locking mechanism, wherein the left and right assembly parts configure a holster that is laterally opened where, once the gun is holstered, the muzzle and the full length of the barrel remain leaning outwards, the holstering of the gun activates the ratchet when yielding under the insertion of the trigger guard, locking the gun in the holster and the release of the gun is produced by the actuation on the locking mechanism and the release button, so that the drawing of the gun is performed perpendicularly to the barrel, allowing to aim from the very first instant of the release of the gun, avoiding unneeded movements and providing a shooter with more time.

5 Claims, 16 Drawing Sheets

(56) References Cited

U.S. PATENT DOCUMENTS

| | | | | |
|---|---|---|---|---|
| 3,910,469 | A * | 10/1975 | Baldocchi | F41C 33/0245 224/678 |
| 4,971,236 | A * | 11/1990 | Grummet | F41C 33/041 D3/222 |
| 5,421,497 | A * | 6/1995 | Gilmore | F41C 33/045 224/198 |
| 5,467,909 | A * | 11/1995 | Resca | F41C 33/0245 224/198 |
| 5,598,958 | A * | 2/1997 | Ryan, III | F41C 33/0254 224/678 |
| 5,855,305 | A * | 1/1999 | Nichols | F41C 33/0209 224/244 |
| 5,918,784 | A * | 7/1999 | Serpa | F41C 33/0263 224/244 |
| 6,634,527 | B2 * | 10/2003 | Liu | F41C 33/0209 224/198 |
| 6,799,392 | B2 * | 10/2004 | Milec | F41C 33/0263 42/70.07 |
| 7,950,554 | B2 * | 5/2011 | Hoffner | A45F 5/02 224/661 |
| 8,371,487 | B1 * | 2/2013 | Plappert | F41C 33/0236 224/587 |
| 8,720,754 | B2 * | 5/2014 | Kirsch | F41C 33/0272 224/198 |
| 10,837,724 | B2 * | 11/2020 | Bordley | F41A 17/54 |
| 11,073,352 | B1 * | 7/2021 | Radcliff | F41A 17/066 |
| 11,499,799 | B2 * | 11/2022 | Self | F41C 33/0245 |
| 2003/0042279 | A1 * | 3/2003 | Locklear, III | F41C 33/0209 224/244 |
| 2003/0141331 | A1 * | 7/2003 | Liu | F41C 33/0209 224/244 |
| 2009/0107865 | A1 * | 4/2009 | Tsai | F41C 33/0263 206/317 |
| 2011/0132951 | A1 * | 6/2011 | Vennemeyer | F41C 33/041 224/660 |
| 2011/0174848 | A1 * | 7/2011 | Kirsch | F41C 33/0263 224/243 |
| 2012/0286005 | A1 * | 11/2012 | Farnlacher | F41C 33/0245 224/244 |
| 2013/0299534 | A1 * | 11/2013 | Rorick | F41C 33/02 224/243 |
| 2014/0109345 | A1 * | 4/2014 | Melville | F41C 33/041 24/3.1 |
| 2015/0377585 | A1 * | 12/2015 | Fowler | F41C 33/0236 224/271 |
| 2017/0284755 | A1 * | 10/2017 | Farringer | F41A 17/54 |
| 2018/0149447 | A1 * | 5/2018 | Waters | H01F 7/0252 |
| 2018/0195834 | A1 * | 7/2018 | Tedder | B60R 7/14 |
| 2020/0049452 | A1 * | 2/2020 | Yeates | F41C 33/0263 |
| 2021/0333064 | A1 * | 10/2021 | Self | F41C 33/0245 |
| 2021/0389082 | A1 * | 12/2021 | Smith | F41C 33/0263 |

FOREIGN PATENT DOCUMENTS

| | | |
|---|---|---|
| EP | 2370777 B1 | 2/2017 |
| EP | 2281170 B1 | 3/2017 |

* cited by examiner

HOLSTER SYSTEM, HOLDER, HOLSTER AND QUICK-RELEASE GUN ANCHOR SYSTEM

OBJECT OF THE INVENTION

The present invention relates to a holster, a support and an anchorage quick release system for guns, for positioning to clothing, objects, equipment or to the wearer's own body capable of being quickly released.

This system is applicable to any gun that can be gripped by a man including replicas and imitations thereof whose weight is supportable by the invention.

The industrial application of this invention lies within the field of gun support systems, straps, belts, holsters allowing the attachment of portable guns to the body or to an object comprising even systems as MOLLE, STRIKE, PALS, RIS, Picantinny, similar and compatible accessories.

BACKGROUND OF THE INVENTION

Although no invention identical to the one described has been found, we present below the documents found which reflect the state of the art related to the same.

U.S. Pat. No. 7,950,554B2 describes a similar strap system which, in practice, is uncomfortable especially when sitting. The ergonomics of the present invention according to claim eleventh corrects this discomfort by requiring one belt less, and by following part (18) the movements of the leg joint, also allowing a lower weight.

Patent number EP1479998A2 presents a fixing device similar to the assembly of FIGS. 14 and 15 although with fewer adjustment shafts according to claim ten, its mechanisms being completely different.

Patent number ES 2 624 194T3 features a double safety holster lacking the features of claim five which eliminates the vertical movement of drawing a gun. While the present invention requires two different movements to activate the locking mechanism (3), and release button (2), the cited patent releases two safety mechanisms with a single movement. According to the claim two the locking systems prevent operation by anyone other than the user as well as a quick release.

Patent numbers EP 2699868 and EP 2281170 present fastening devices similar to the fastening mechanism described in claim ten. The present invention improves the degrees of adjustment according to claim ten and provides greater simplicity of manufacturing.

U.S. Pat. No. 8,720,754B2 presents a similar device lacking the features of claims one and two.

U.S. Pat. No. 5,598,958A features a similar system; however, it is only intended to be drawn quickly, not for operating in a tactical or combat environment according to claim one and lacks the locking system according to claim two.

Conclusions: As can be seen from the research carried out, none of the documents found solves the problems posed as the proposed invention does.

DESCRIPTION OF THE INVENTION

The holster, support and anchorage quick release system for guns, object of the present invention, regarding the quick release mechanism section as compared to the present systems, the latter suffer from a delay due to the movements necessary to draw the gun which the present invention corrects and improves.

In other cases, such as competition holsters, the retention system is based on a sphere which blocks the trigger guard, which requires a vertical drawing movement and/or are not built with sufficient strength so that they would be quickly damaged in combat conditions, or lack a positive action which prevents release by third parties.

In the case of the gun being carried on the leg or belt, the existing holsters force the shooter to extract it vertically or horizontally in part or in its entirety before initiating the aiming movement towards the target. The present invention eliminates this movement by initiating the aiming movement from the very same instant of its release. The same occurs in any support position, be it chest, side, anchorage to a vehicle or object, etc.

By improving the speed with which the gun is drawn and aims, the present invention enables the shooter to gain a time advantage over existing holsters. The wearer of the gun is able to open fire faster than with existing holsters.

Existing holsters incorporating a locking safety either is bulky, cumbersome or makes access to the gun itself difficult, whereas the safety incorporated in the present invention improves upon the above while accomplishing several objectives: being operable with gloves, preventing anyone but the gun carrier from easily releasing it in order to snatch the gun from the carrier, and establishing a second level of security against an accidental release of the gun.

According to a preferred embodiment, the system can be made of light materials, aluminum, plastic, etc., which improves the ergonomics of the current systems and the comfort of use.

The described quick release system can be used while seated in a vehicle since it is not necessary to make a drawing movement as in the conventional ones, i.e., the elbow does not interfere with the seat or the vehicle.

The entire system can withstand a pulling force of more than 40 kg exerted on the weapon.

BRIEF DESCRIPTION OF THE DRAWINGS

For a better understanding of the present description, drawings representing a preferred embodiment of the present invention are provided herewith:

FIG. 2: Complete view of a possible embodiment of the quick release holster assembly anchored to a tactical vest by means of a MOLLE system or similar.

Figure 1:
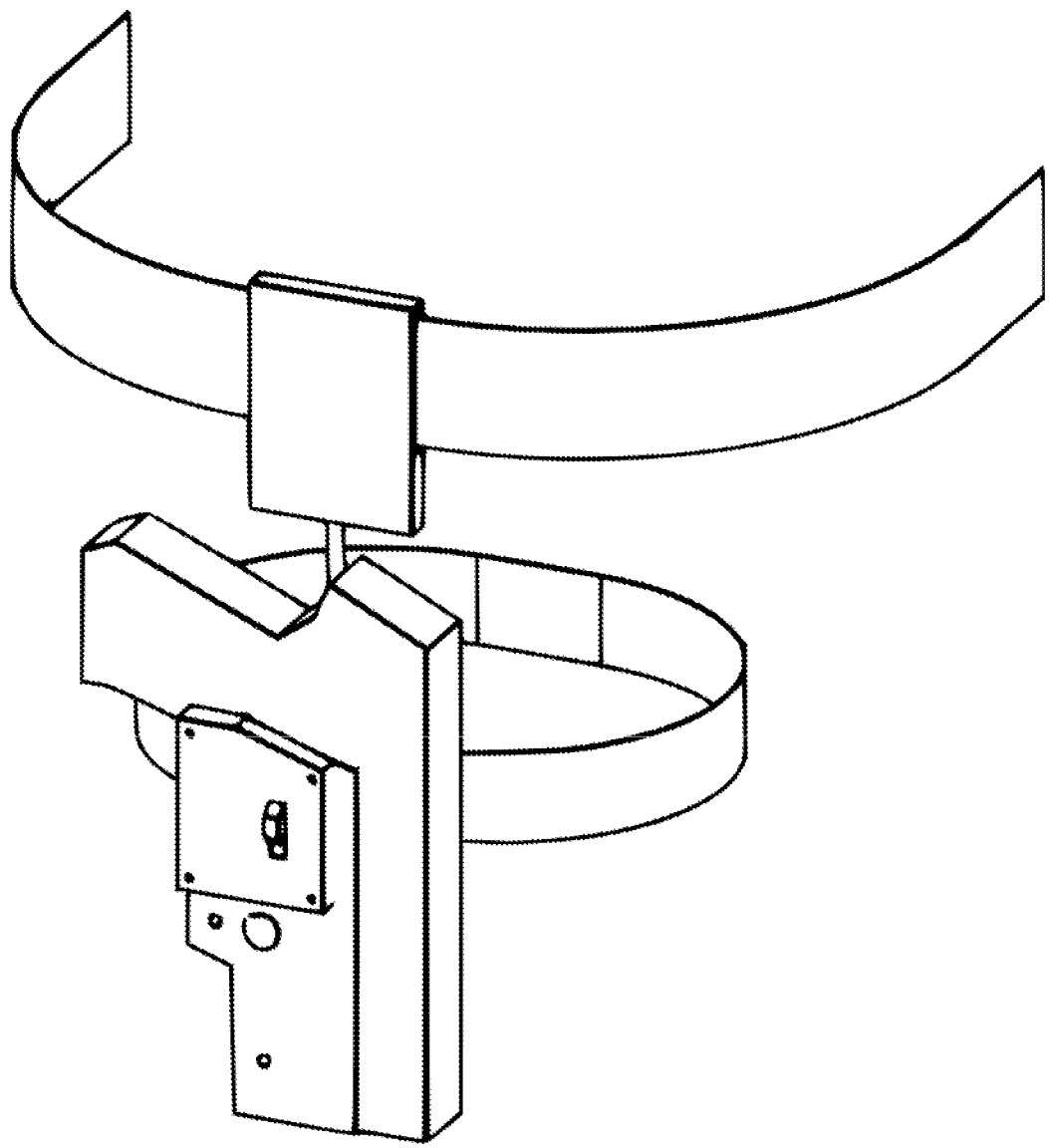
FIG. 1: Complete view of a possible embodiment of the system on leg strap.
Figure 2:
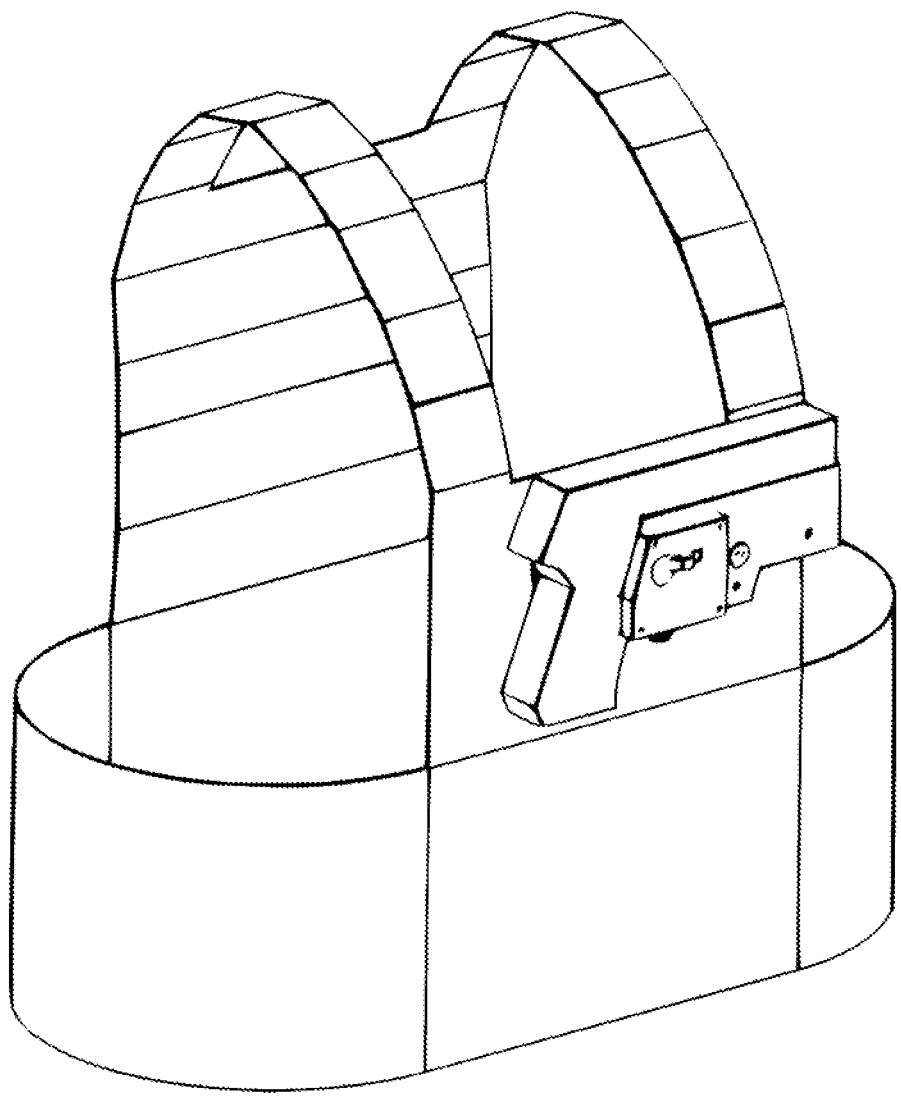
Figure 3:
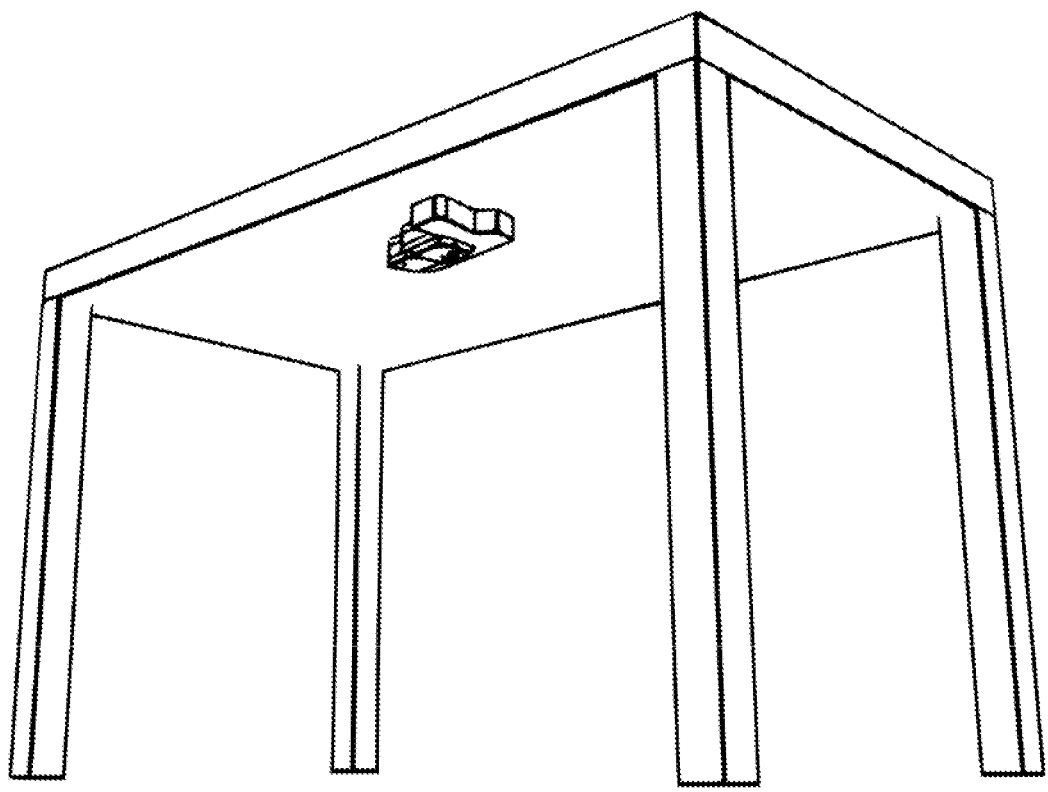
FIG. 3: View of a possible anchoring of the quick release holster to an object, a table in this case.
Figure 4:
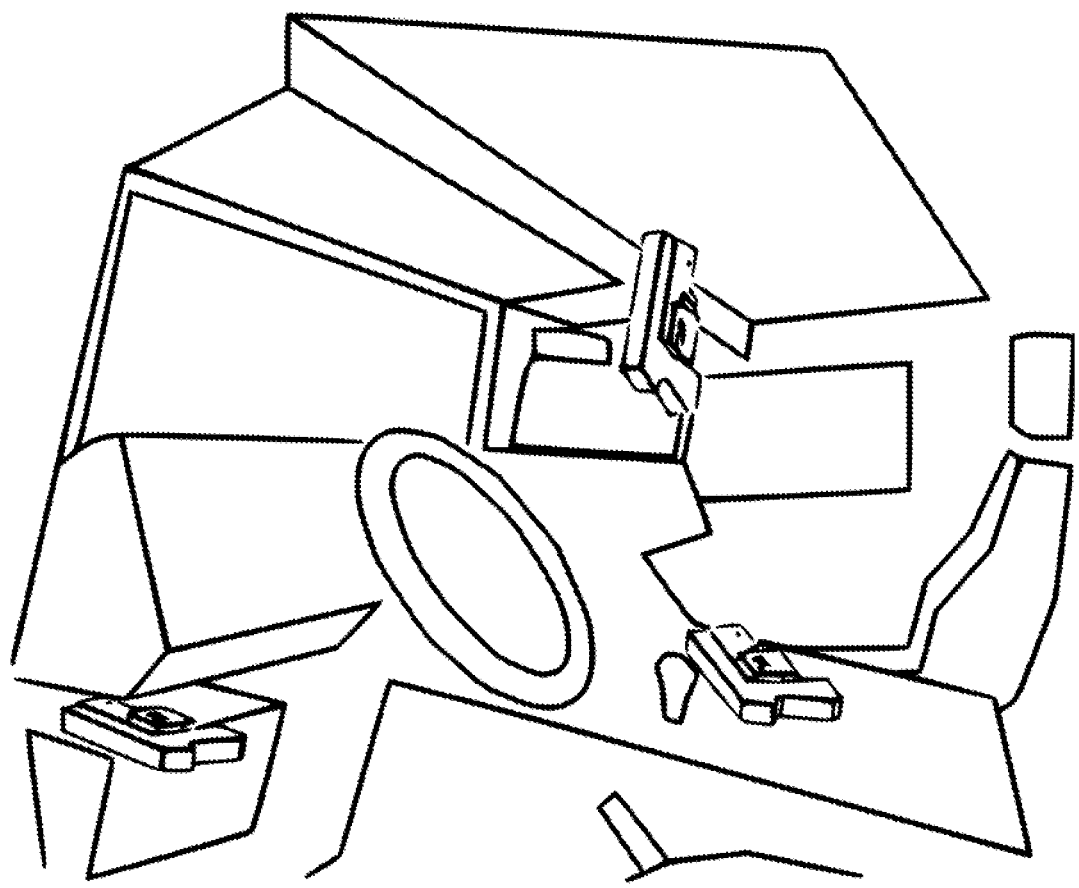
FIG. 4: View of a possible attachment of the quick release holster to a vehicle.
Figure 5:
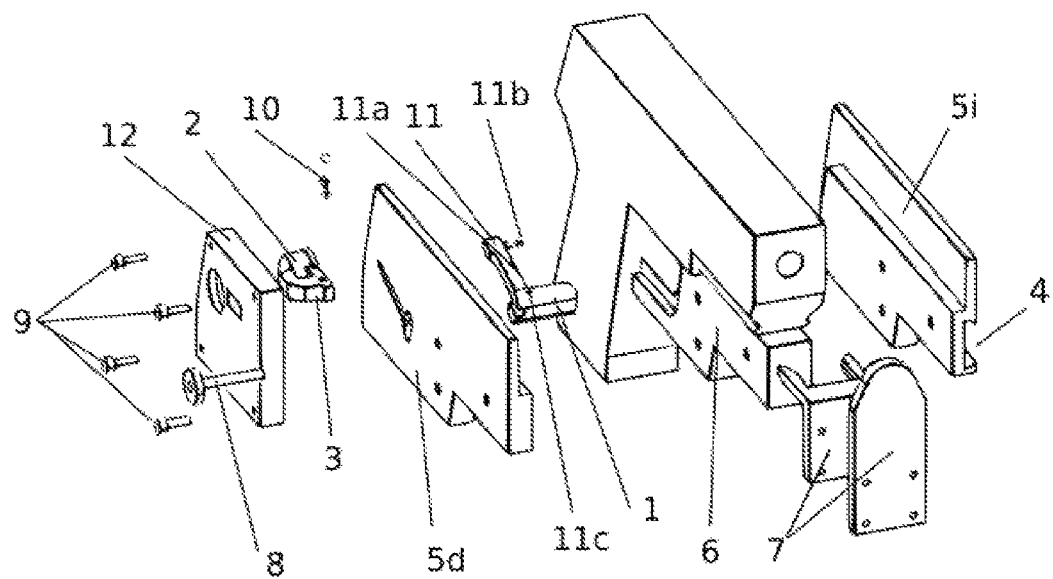
FIGS. 5, 6, 7, 8, 9, 10, 11: Details of possible embodiments of the quick release holster mechanism.
Figure 6:
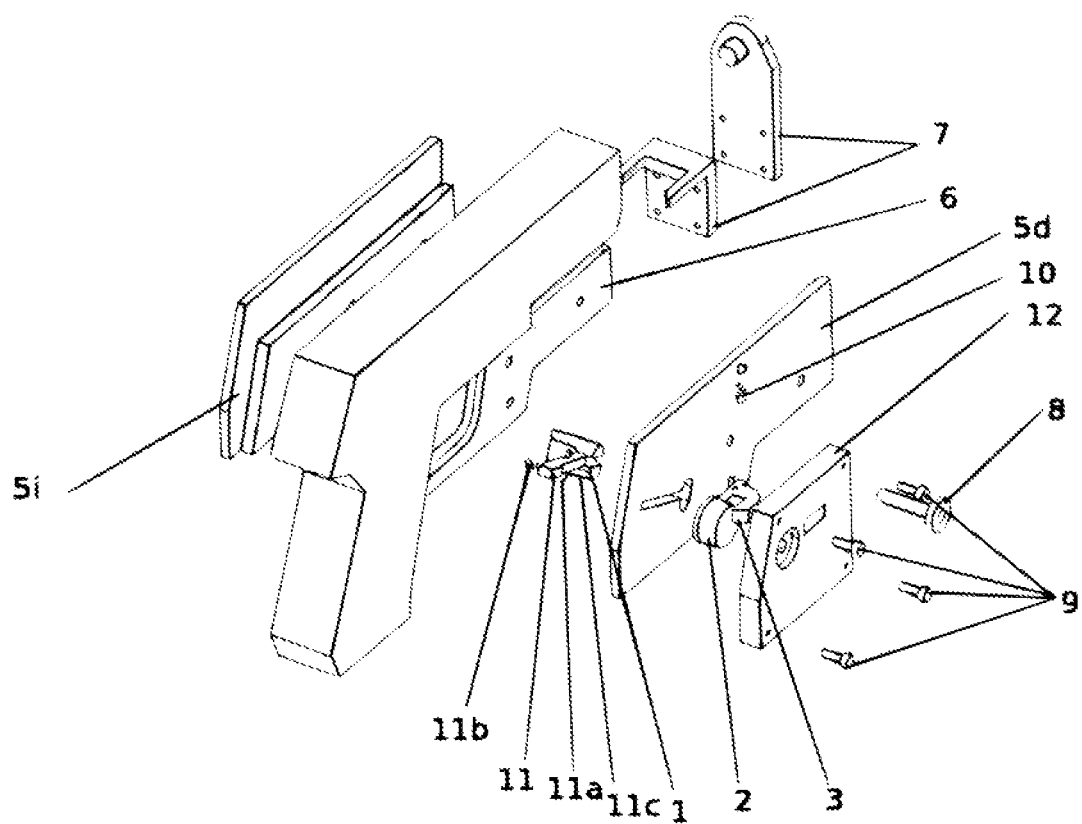
Figure 7:
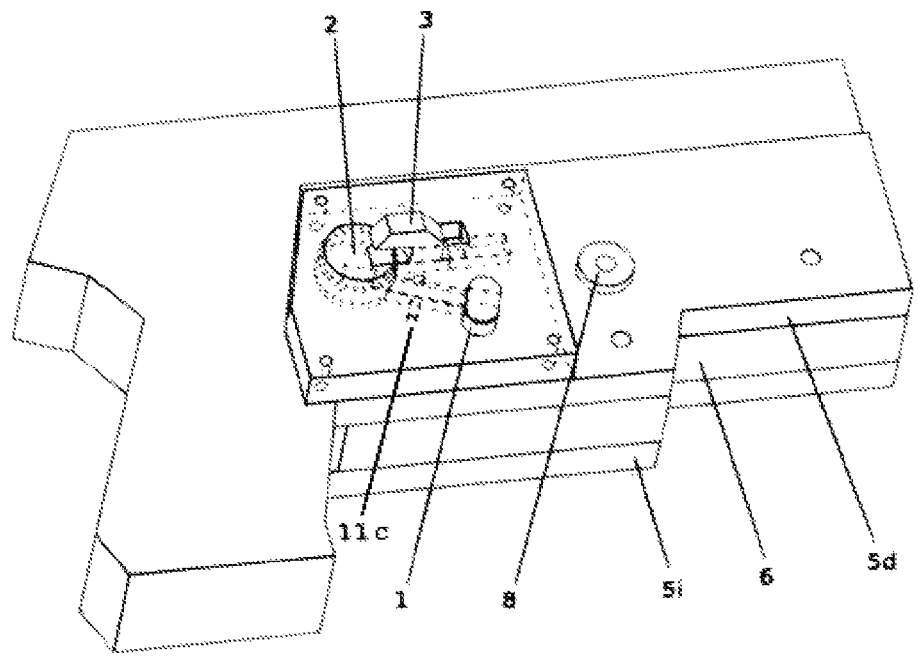

The numerical references appearing in said figures correspond to the following constituent elements of the invention:
1. Trigger guard ratchet.
2. Release button
3. Locking mechanism
4. Rail, RIS, Picatinny or compatible housing machining
5. Left (5i) and right (5d) main assembly part
6. Main assembly part
7. Stabilizers
8. Through bolt
9. Screws
10. Ball spring assembly
11. Ratchet arm
12. Ratchet and locking housing
13. Rail
14. Right fitting
15. Left adjustment
16. Locking
17. Belt
18. Flexible joint
19. Belt attachment piece
20. Leg belt fastening piece
21. Molle spider or Molle holster holder
22. Pressed bushing
23. Pin
24. Part added to the gun itself
24a. Machining or modification of the weapon

DESCRIPTION OF A PREFERRED EMBODIMENT

The main gun release mechanism may comprise the following parts (FIGS. 5, 6, 7, 8 and 9):

Trigger guard ratchet (1). The function of said ratchet is to lock the gun in the invention as soon as it is inserted by yielding its beveled side under the insertion action of the trigger guard of the gun. The release of the ratchet (1), is commanded by the ratchet arm (11), in turn pressed by the release button (2). The ratchet arm (11) pivots on an axis (11a) and is held pressed in the locked position by a spring (11b) such that if no action is exerted on the release button (2), release of the gun is impossible. The ratchet arm (11) is attached to the ratchet (1) by means of the pin (11c) which is housed with sufficient play in its through bore in the ratchet arm to allow free circular movement around the shaft (11a).

The trigger guard ratchet (1) is housed in a ratchet and locking housing (12) comprising the main parts (5i, 5d, 6 and 12). The ratchet and locking housing (12) may be common to all model guns while parts (5i, 5d and 6) are molded or machined to achieve a perfect fit to the shape of the weapon for which it is intended. Assembly parts (6 and 5d) are bolted by through bolts to assembly part (5i) or by another method depending on the manufacturing material.

Part (5i) has a machining or molding (4) intended to accommodate the rail (13), a Picatinny rail, an RIS or any compatible one.

The through bolt (8) reaches the machining (4), threaded on the assembly (5i, 6, 5d). Its tightening allows to block the sliding of the rail (13) or its position adjustment along the rail itself.

The stabilizers (7) screwed to the main assembly part (6) according to the type of gun allow a stabilized fixation of the front of the gun, according to the shape of the gun, RIS machining or similar or the muzzle itself.

Figure 8:
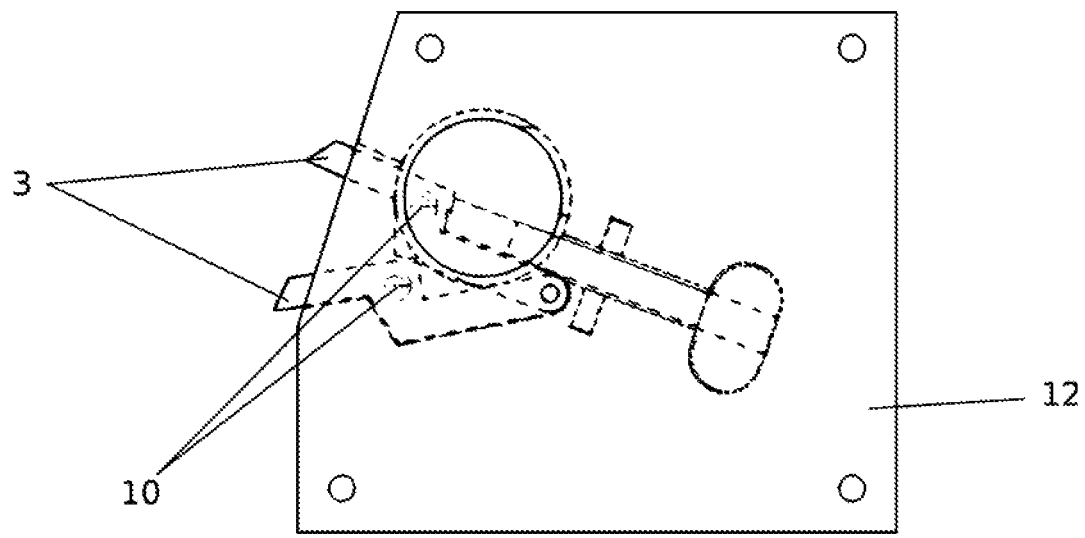
Figure 9:
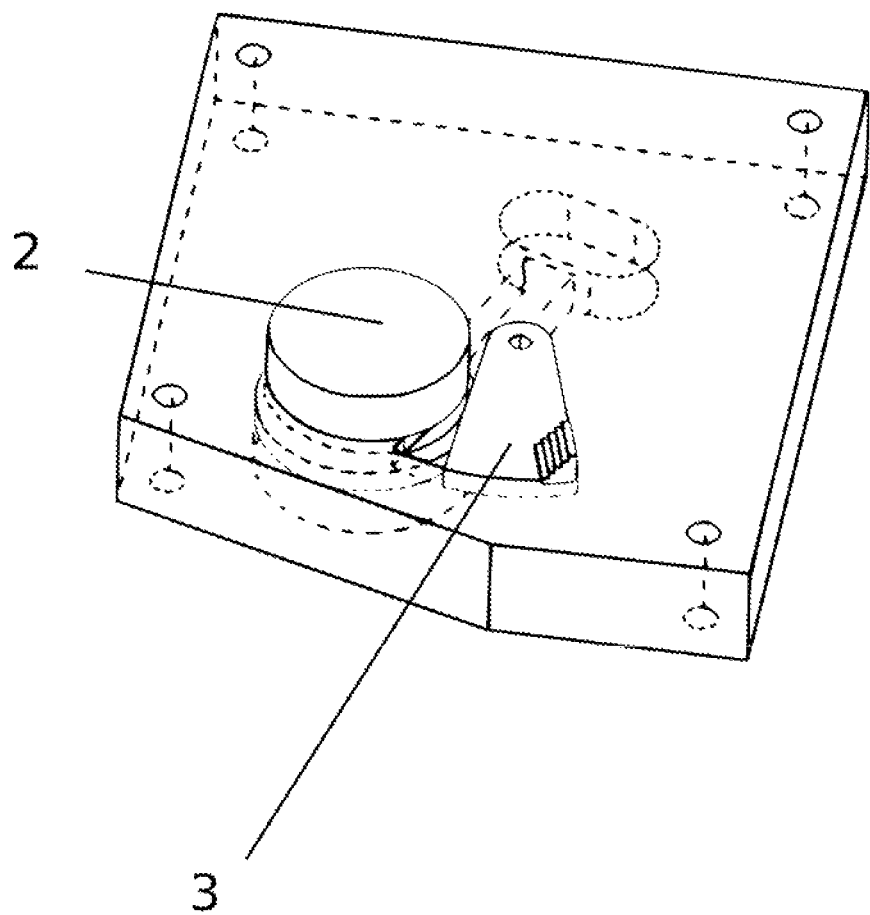

FIGS. 8, 9: The ratchet and locking housing (12) contains the locking mechanism (3), the shaft housing (11a) and the release button (2). The locking mechanism (3) in its possible embodiments (FIGS. 5, 8, 9) is retained in its positions by means of a spring and ball assembly (10) which engages in a recess in the locking mechanism (3), or in the ratchet and locking housing (12). The locking mechanism (3) prevents actuation of the release button (2) when it is in the locked position by interposing itself in the possible travel of the release button (2), and allows actuation of the release button (2) when it is in its unlocked position allowing the travel of the release button (2).

The ratchet and locking housing (12) is fixed to the assembly (5i, 5d, 6) by means of screws (9) or other method depending on the material from which it is made.

Figure 10:
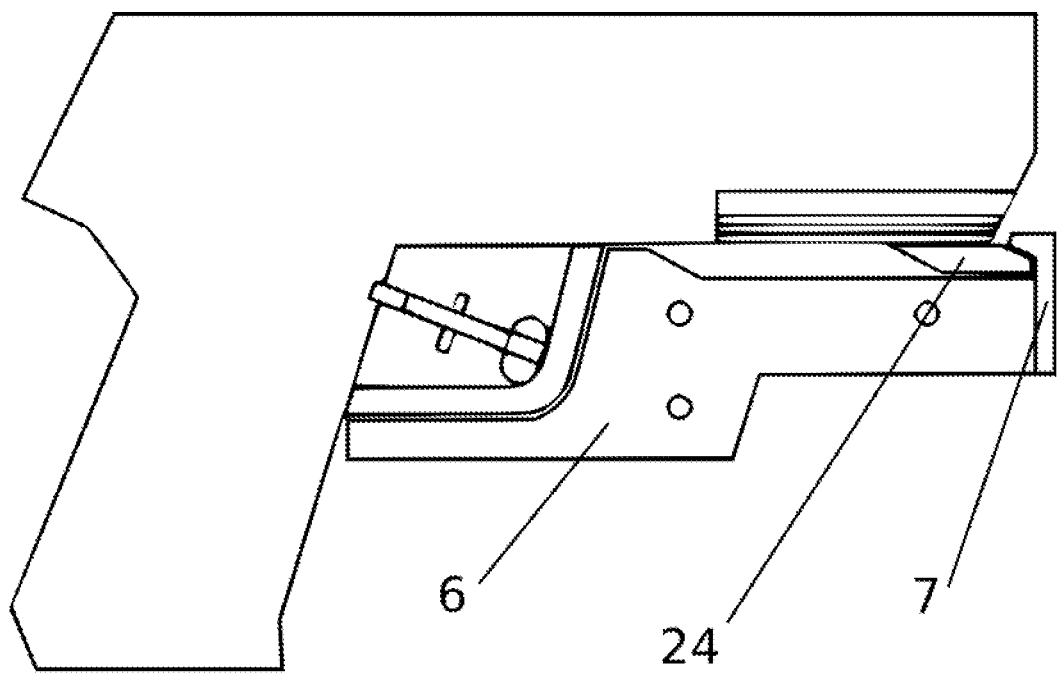
Figure 11:
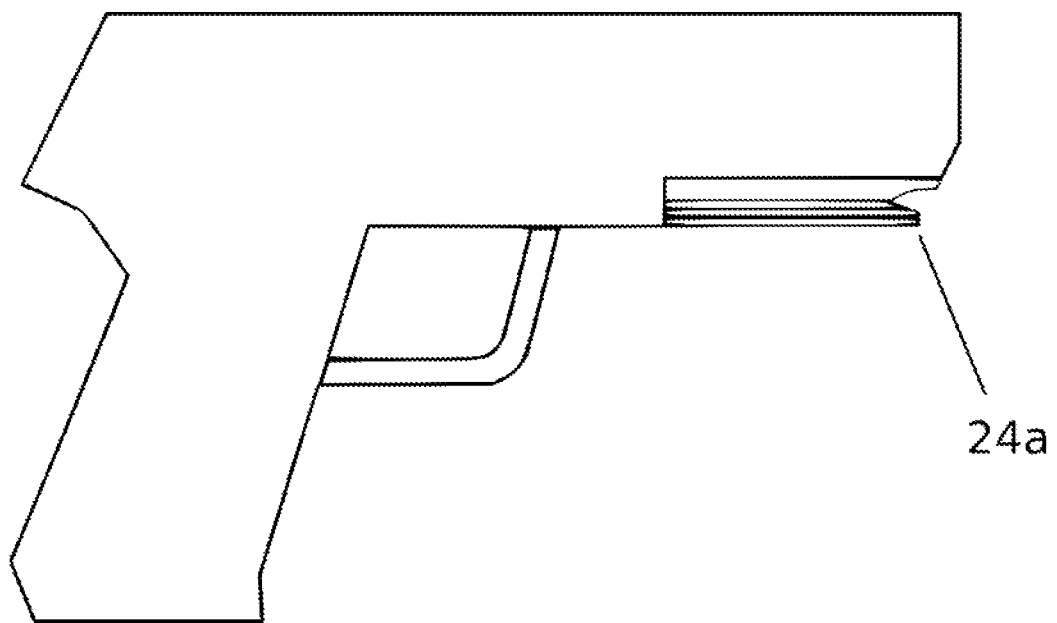

FIGS. 10, 11: The gun can also be attached to the release mechanism in the area near the muzzle by means of the stabilizer (7). Said piece can be screwed to the mechanism according to FIGS. 5 and 10, where the shape of the gun itself, its barrel or a piece (24) added to the gun itself, or a modification thereof (24a) is used: FIG. 11.

Figure 12:
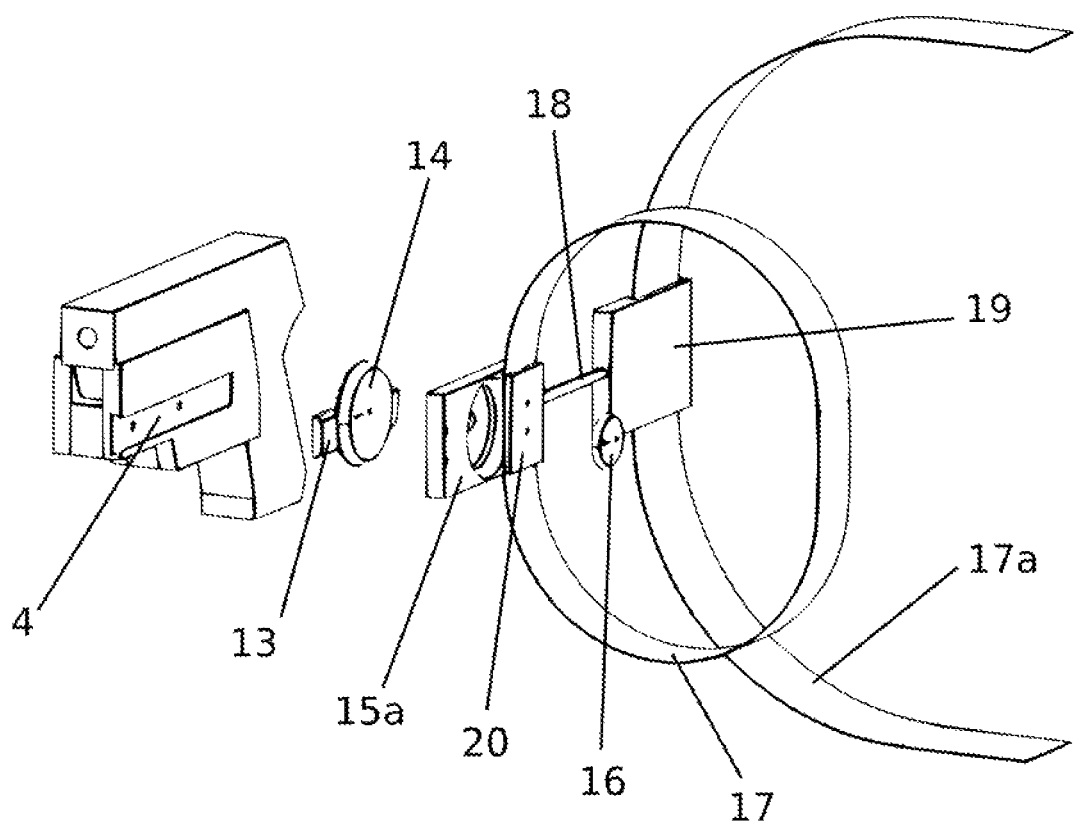
FIG. 12: Detail of a possible overall embodiment of the quick release holster adjustment and anchoring system to a harness or leg strap.
Figure 13:
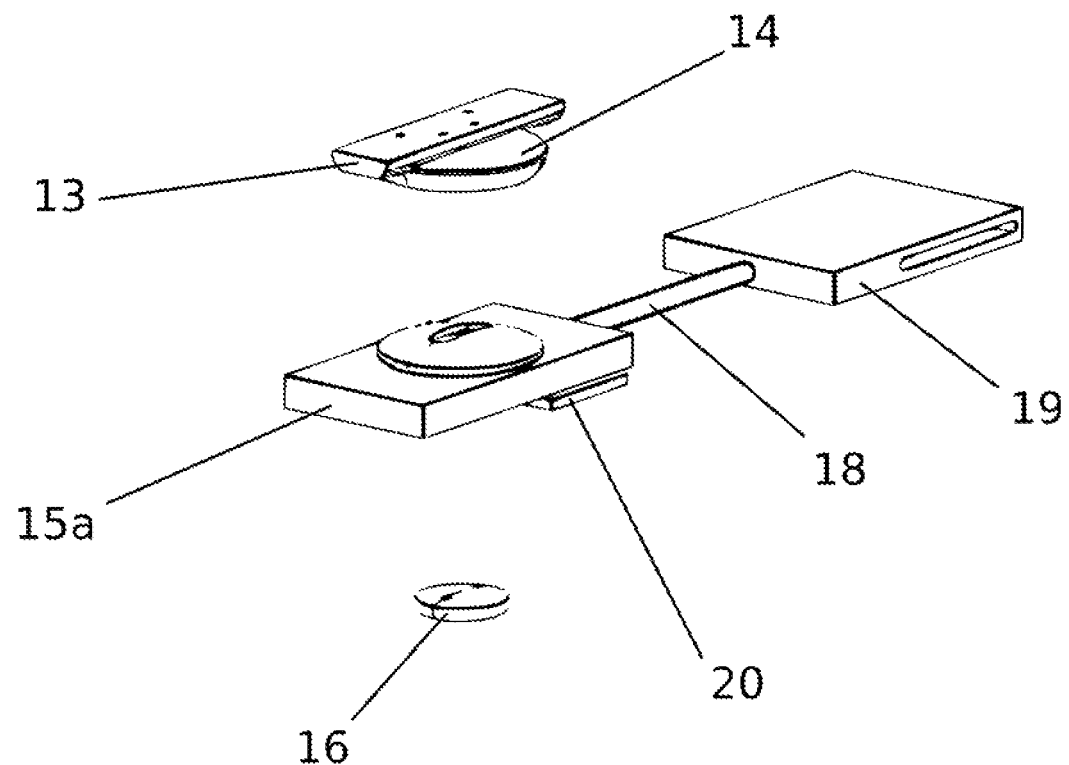
FIG. 13: Detail of a possible embodiment of the quick release holster support and adjustment mechanism.

FIG. 12, 13: Attachment of the hanger bracket system. The quick release assembly is anchored to the rail (13) by means of the machining (4) and the through bolt (8). The right fitting (14) has a concave, roughened or knurled inner surface, which seats on the left fitting (15a) or (15) which has a convex roughened or knurled surface (FIGS. 12, 13), and is locked in position by a convex surface locking piece (16) which seats on the concave surface of the left fitting (15a).

Part (19) has a housing for the belt (17a). Part (15a) is fixed to the leg belt (17) by means of part (20) screwed to the previous one. The flexible joint (18), detailed in FIG. 14, connects part (19) with part (15a) or (15b) (FIG. 14).

Figure 14:
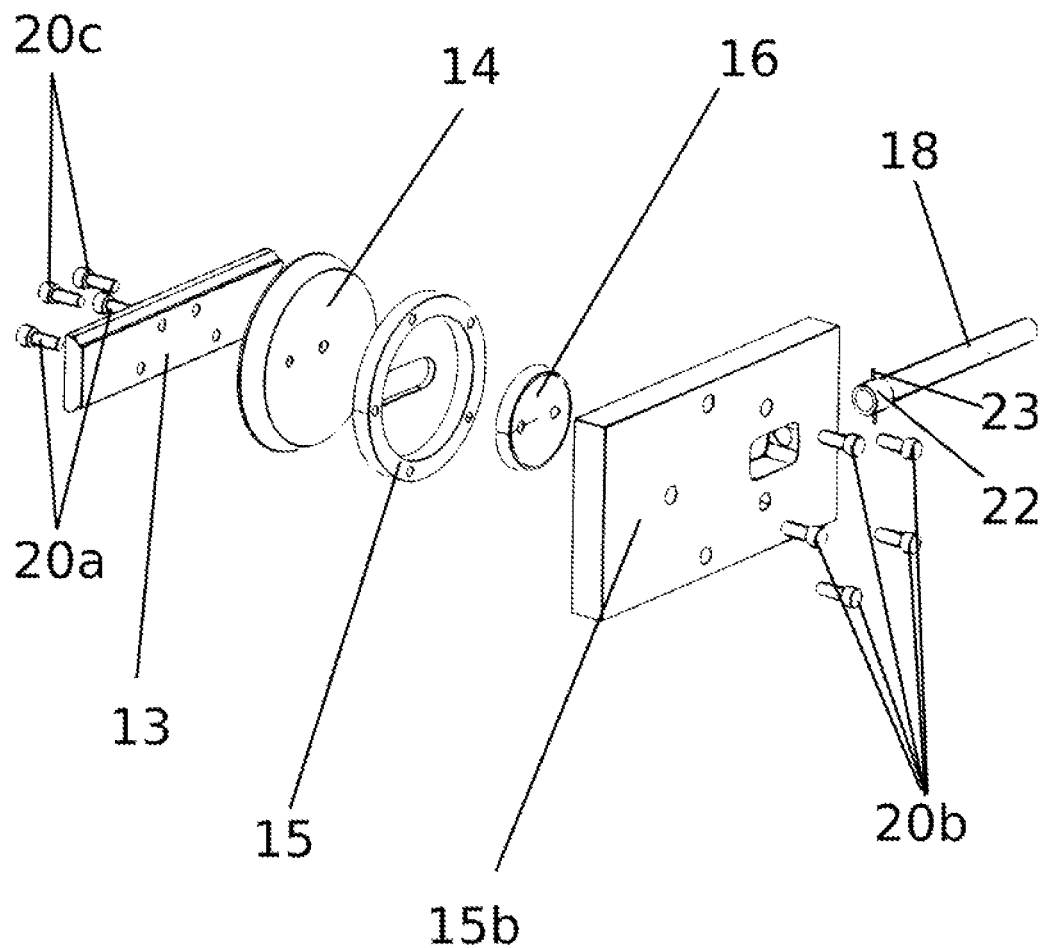
FIG. 14: Detail of a possible embodiment of the quick release holster support and adjustment mechanism that can be detached from the main support block 15b.

FIG. 14: A possible embodiment of the adjustment mechanism (14, 15, 16) in which for manufacturing reasons it is required to be manufactured separately in the manner separated from part (15a).

The left fitting (15) is fixed to the support part (15b) by means of the screws (20b) or another method. The screws (20a) fasten the rail to the right fitting (14) via through bolts in the rail (13).

The screws (20c) are screwed into the locking (16) allowing some play in the normal axis of the assembly in turn allowing tilting of the rail (13) and thus the gun.

Detail of the attachment of the flexible joint (18) to parts (19, 15a, 15b). A possible embodiment of the flexible joint (18) by means of a metallic spring or a braided steel cable. It is fixed at the ends by means of a pressed bushing (22) at its end, which is housed in a machined or moulded seat into parts (19, 15a, 15b). A pin (23) prevents rotational or oscillating movements.

Figure 15:
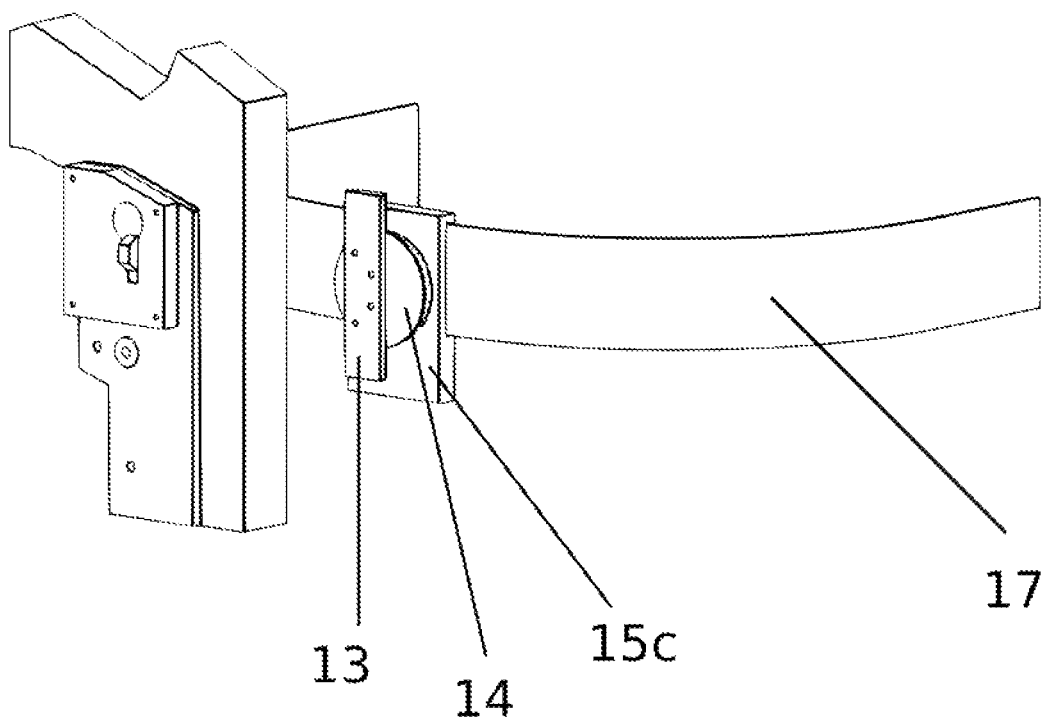
FIG. 15: Detail of a possible simplified realization of the system showing only one anchorage to the belt.

FIG. 15: A possible simplified embodiment of the system. Part (15c) is directly attached to the belt (17), and to part (15c) the adjustment mechanism containing parts (14, 15, 16) and the rail (13). The adjustment mechanism can be dispensed with and the rail (13) can be directly anchored to part (15c), by means of screws or other method depending on the manufacturing material.

Figure 16:
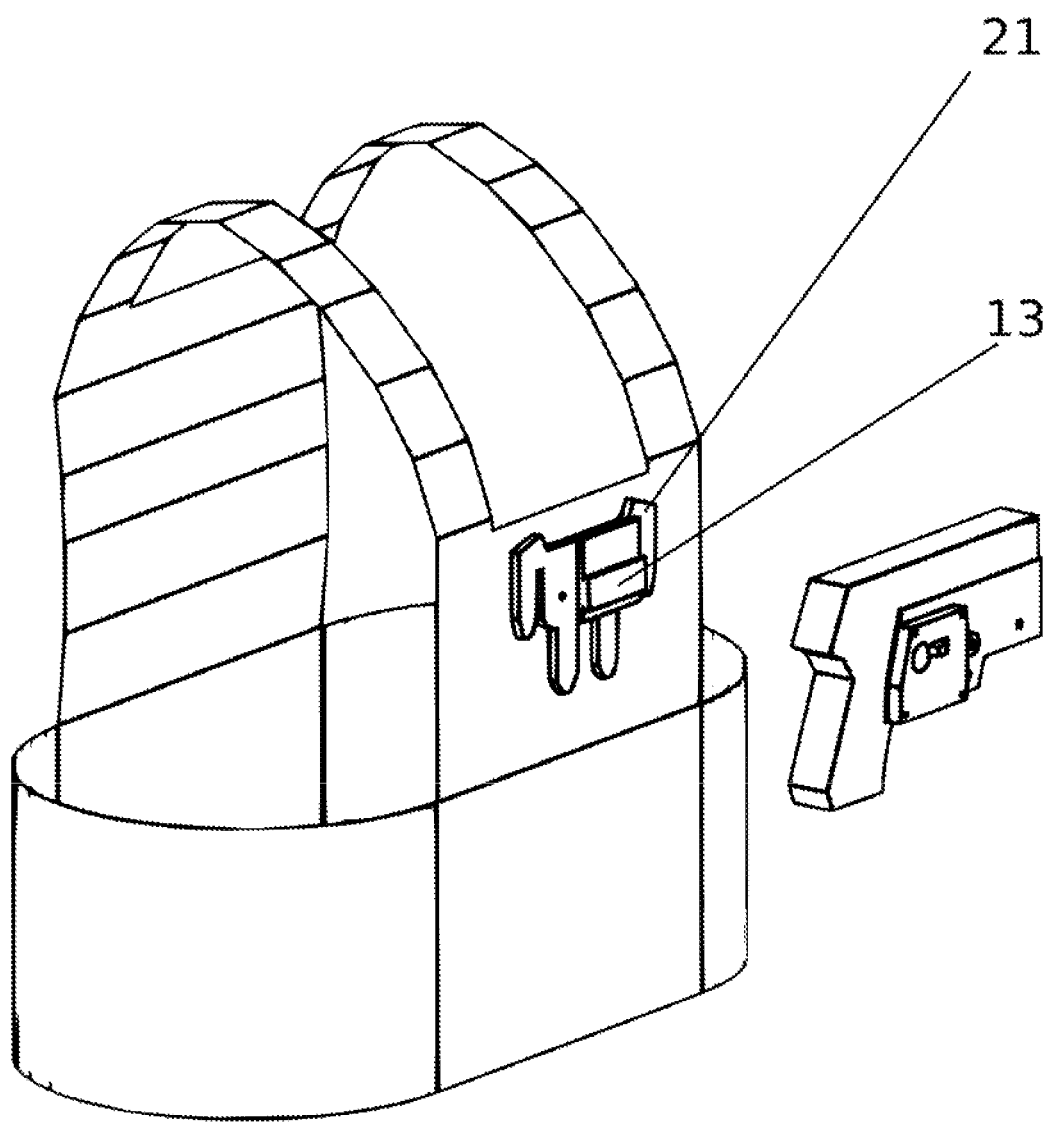
FIG. 16: Detail of a possible realization of the quick release holster anchorage to a tactical vest.

FIG. 16: Detail of the rail (13) screwed to a MOLLE attachment, or MOLLE spider for holster (21) on tactical vest. The inclination adjustment is given by the position of the rail fastening screws in the holes provided in the MOLLE attachment.

The invention claimed is:
1. A holster, support, and anchorage quick release system for guns, comprising:

left and right assembly parts configured to guide the gun when holstered;

a trigger guard ratchet; and a release button and a locking mechanism;

wherein the left and right assembly parts configure a holster that is laterally opened where, once the gun is holstered, the muzzle and the full length of the barrel remain fully exposed outwardly;

the holstering of the gun activates the ratchet when yielding under the insertion of the trigger guard, locking the gun in the holster; and the release of the gun is produced by the actuation of the locking mechanism followed by actuation of the release button, so that the drawing of the gun is performed perpendicularly to the barrel, allowing to aim from the very first instant of the release of the gun, avoiding unneeded movements and providing a shooter with more time.

2. The holster, support, and anchorage quick release system for guns according to claim 1, further comprising a front support and a main assembly part that allow a stabilized fixation of the gun.

3. The holster, support, and anchorage quick release system for guns according to claim 1, wherein the locking mechanism remains fixed at rest by a spring-ball assembly housed in a recess in the locking mechanism or in the ratchet and locking housing.

4. The holster, support, and anchorage quick release system for guns according to claim 1, wherein a fixing rail can be fixed by means of screws to objects, vehicles and to a MOLLE system.

5. The holster, support, and anchorage quick release system for guns according to claim 4, wherein fixing rail locks the holster when a through bolt is tightened on it, also allowing a longitudinal adjustment on said rail.

* * * * *